United States Patent [19]

Michel

[11] Patent Number: 5,298,821
[45] Date of Patent: Mar. 29, 1994

[54] BATTERY-POWERED TOOL
[75] Inventor: Timothy P. Michel, Naperville, Ill.
[73] Assignee: S-B Power Tool Company, Chicago, Ill.
[21] Appl. No.: 662,615
[22] Filed: Feb. 28, 1991
[51] Int. Cl.$^5$ .............................................. H02J 7/00
[52] U.S. Cl. ...................................... 310/47; 310/50; 320/2
[58] Field of Search ................. 310/47, 50; 320/2, 3, 320/5, 7, 16; 429/99, 100, 96, 163; 173/163

[56] References Cited

U.S. PATENT DOCUMENTS

| | | | |
|---|---|---|---|
| 3,718,848 | 2/1973 | Hines | 320/7 |
| 3,734,207 | 5/1973 | Fishbein | 310/50 |
| 3,999,110 | 12/1986 | Ramstrom et al. | 320/2 |
| 4,581,570 | 4/1986 | Mejia | 320/2 |
| 4,649,332 | 3/1987 | Bell | 320/7 |
| 4,728,876 | 3/1988 | Mongeon et al. | 310/50 |
| 4,814,631 | 3/1989 | Jackson | 307/53 |

OTHER PUBLICATIONS

Dremel, Freewheeler Owner's Manual, Oct. 1989.

Primary Examiner—Steven L. Stephan
Assistant Examiner—Matthew Nguyen
Attorney, Agent, or Firm—Jones, Day, Reavis & Pogue

[57] ABSTRACT

A battery-powered tool (10) generally comprises a motor (24) having a positive terminal (64) and a negative terminal (66) extending therefrom for continuous engagement to a rotatable actuator (26). Actuator (26) has a plurality of conductive arms (28) extending therefrom for contact with a battery assembly (20) such that the actuator (26) can be selectively rotated to engage the motor (24) in both high speed and low speed operations.

15 Claims, 4 Drawing Sheets

BATTERY-POWERED TOOL

FIELD OF THE INVENTION

This invention relates in general to power tools and in particular to a hand-held tool utilizing batteries.

BACKGROUND OF THE INVENTION

There has been an increased demand for lightweight miniature tools with simplified internal working parts. Tools such as draftsmen's erasers that have a rotating head attached to a hand-held handle have been used for several years. Unfortunately, these hand-held tools were encumbered by an electrical line which had to be plugged into an AC outlet.

A need arose for a hand-held tool that could use standard direct current battery cells for powering the motor. To meet this demand, manufacturers assembled miniature hand-held tools that served the immediate purpose. However, they require electrical connection or wiring within the tool that complicated assembly and created electrical losses. The electrical losses caused increased demand on the battery cells, and accordingly, resulted in a shortened life for the battery cells in these applications.

A need has therefore risen for an improved hand-held battery-powered tool which does not have the unwanted internal wiring complications as do other battery-powered hand-held tools.

One aspect of the present invention comprises a battery-powered hand-held motor tool for rotating a bit and which generally comprises a substantially cylindrical-shaped housing having a direct-current motor mounted therein. As with most conventional motors, the motor has a shaft at one end and first and second terminals at its other end. The first and second terminals correspond to the positive and negative poles of the motor. Connected to the shaft is a substantially cylindrical-shaped collet for selective engagement with a bit. The bit may be one of a number of items, such as a drill or a sander.

To power the motor, a battery assembly having a plurality of battery cells contained therein is slidably engaged into the housing and clipped to the housing of the tool. The battery cells are conveniently recharged by a battery charger which has an AC wall plug integrally connected thereto for engaging into a standard AC outlet.

A substantially disc-shaped actuator is rotatably held in the housing. The actuator is coaxially aligned with the motor and battery assembly. In operation, the actuator is positioned between the motor and the battery assembly. The motor is electrically attached to the actuator at one end. The actuator has a first set of arms, a second set of arms and a third set of arms extending therefrom for selective electrical engagement with the battery assembly contacts. Specifically, the first, second and third sets of arms are selectively connected to the battery assembly contacts by rotation of the actuator to a first position in order to couple the batteries in series and cause the motor to rotate the bit at high speed. Additionally, the first and second sets of arms are selectively connected to battery contacts by rotating the actuator to a second position to contact the battery assembly such that the batteries are coupled in a parallel condition with the motor to rotate the bit at a low speed.

The present invention presents several technical advantages over the convention battery-powered hand-held motor tools.

Since the battery assembly is one piece, it can be easily removed from the housing and the battery cells can be recharged with the battery charger. In addition, because of the orientation of the battery cells within the battery assembly and the ability to have the actuator rotate to selectively contact the battery assembly, internal wiring can be greatly reduced, and accordingly, the load on battery cells can be reduced.

BRIEF DESCRIPTION OF THE DRAWINGS

Other aspects of the invention and their advantages will be discerned after studying the Detailed Description in conjunction with Drawings in which.

DETAILED DESCRIPTION OF THE INVENTION

Figure 1:
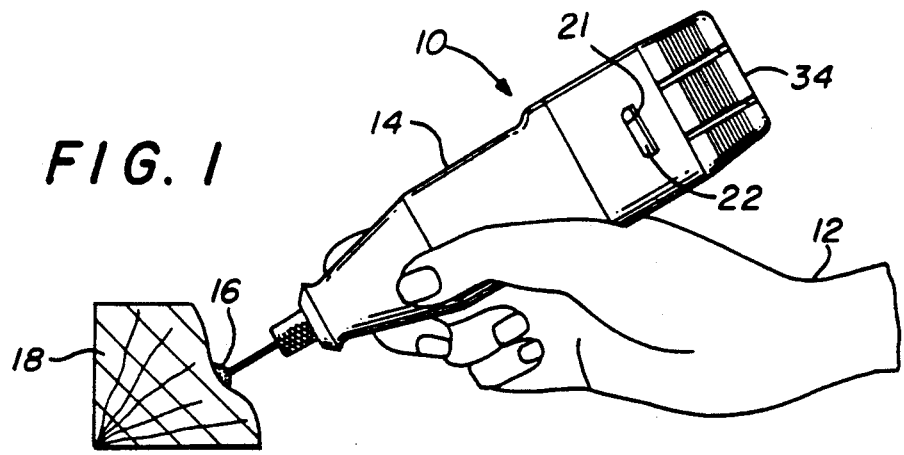
FIG. 1 is a perspective view of the hand-held tool as seen in its environment.

Referring initially to FIG. 1, a battery-powered hand-held tool is shown in a perspective and is generally designated by the numeral 10. As can be seen, tool 10 generally comprises a housing 14 and having a bit 16 attached thereto. Housing 14 is conformed such that a hand 12 can easily form to its contours. In operation, bit 16 rotates to form a desired shape of object 18. As can be appreciated, bit 16 may be one of a large variety of accessories including, for example only, an abrasive wheel, a drill bit, a wire brush, a polisher, an engraver, a cutter, a router bit, or a cutting wheel. In addition, the accessories come in a variety of shapes and permit the use of the tool 10 to do a plurality of jobs.

Figure 2:
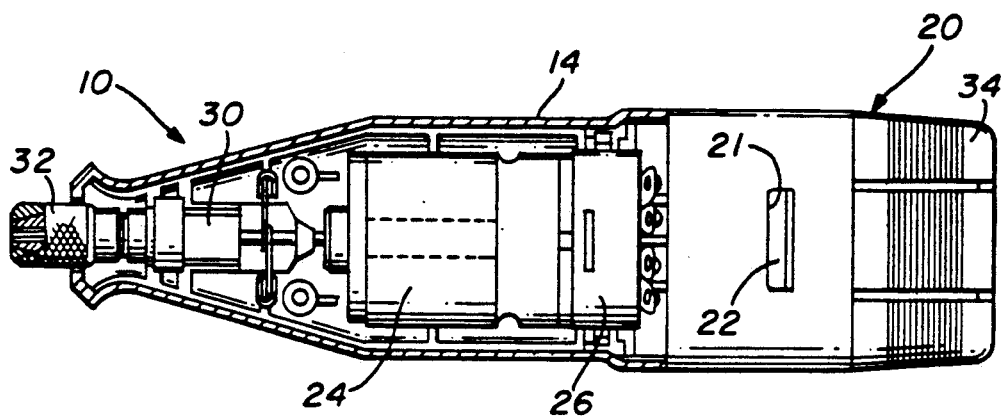
FIG. 2 is a partial cross-sectional view of the tool illustrating the connection between a motor and a battery assembly.

Referring now to FIG. 2, a partial cross-sectional view of the tool 10 can be seen. In general, tool 10 comprises housing 14 having a battery assembly 20 attached thereto. Battery assembly 20 is connected to the housing 14 by the use of a flexible wall portion having a locking member 22 that engages a slot in housing 14. Fixedly held inside housing 14 is a motor 24. Motor 24 has a shaft 30 extending therefrom for engagement to a collet 32. Collet 32 is used to hold bit 16 (shown in FIG. 1). Motor 24 has an actuator 26 connected to its end opposite shaft 30. Actuator 26 has a plurality of arms 28 extending therefrom for engagement with electrical contacts on battery assembly 20.

Figure 3A:
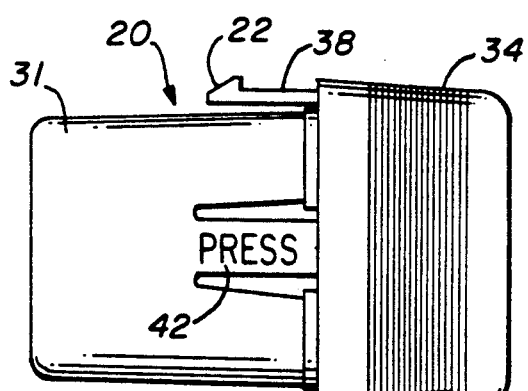
FIG. 3A is a side view of the battery assembly.

Battery assembly 20 can be more easily understood by reference to FIG. 3A which shows a battery casing 31 attached to a cover 34. Cover 34 has external flexible walls 38 extending therefrom. Walls 38 correspondingly have catches or locking members 22 integrally formed therewith for engagement with slot 21 in housing 14 (shown in FIG. 2). The functionality of battery assembly 20 can be more easily understood by reference to FIG. 3B.

Figure 3B:
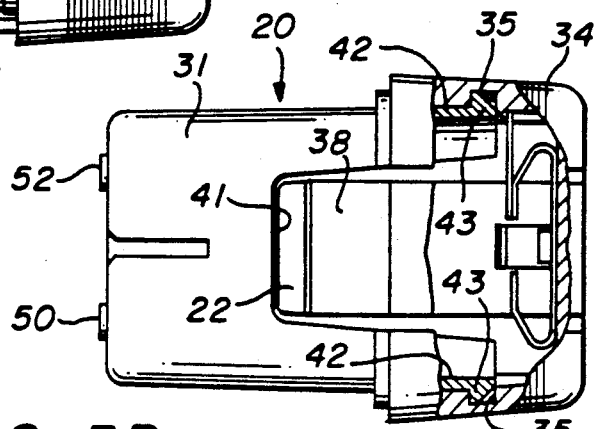
FIG. 3B is a partial cross-sectional view of the battery assembly.

FIG. 3B is a partial cross-sectional view of battery assembly 20. Battery assembly 20 has a chamber or cover 34 for casing 31 which holds a plurality of battery cells (see FIG. 4E). In addition, fixedly attached to the base of cover 34 are two conductive springs 40 each of which electrically connects two battery cells in series as shown in FIG. 4B. Battery casing 31 has a plurality of orifices 46, 48, 50 and 52 through which battery engagement with the switch actuator 26 shown in FIGS. 6A and 6C can take place. In addition, internal flexible walls 42 form part of casing 31 to releasedly engage cover or cap 34 by catches 43 to removably attach the cap 34 to casing 31 after the batteries are inserted in casing 31. External flexible walls 38 on cap 34 have catches 22 at the top thereof for releasedly engaging the slot 21 in motor housing 14.

Figure 3C:
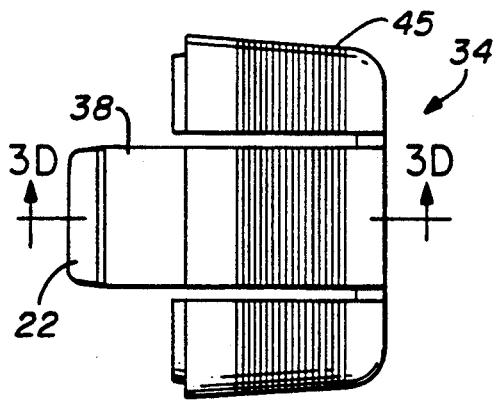
FIG. 3C is a side view of the cap portion of the battery assembly.
Figure 3D:
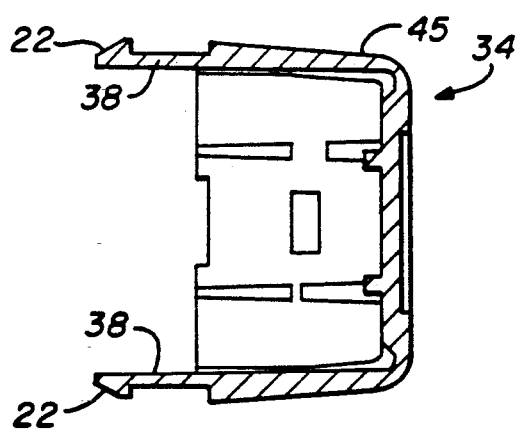
FIG. 3D is the cross-sectional view of the cap taken along lines 3D—3D.
Figure 3E:
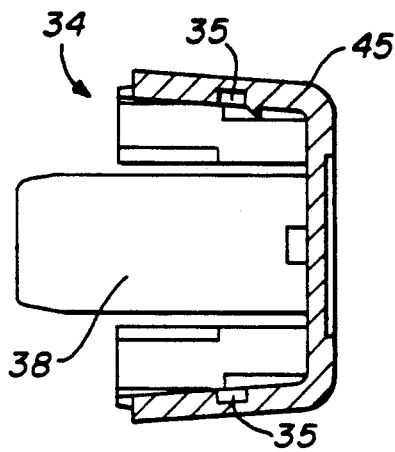
FIG. 3E is a cross-sectional view of the cap taken along a line perpendicular to the section as shown in FIG. 3D.

FIG. 3C is a side view of the cap 34 illustrating the external flexible walls 38 with the catch or locking member 22 on the outer end thereof. The base portion 45 of cap 34 is shown in a cross-sectional view in FIG. 3D and illustrates clearly the flexible walls or arms 38 with the catch or locking members 22 at the outer ends thereof. FIG. 3E is a cross-sectional view of the cap 34 taken perpendicular to the section in FIG. 3D. Notches 35 are shown in the walls 45 of the cap 34 for receiving the locking members 43 on flexible arms 42 of the battery casing 31, discussed previously in relation to FIG. 3B. Thus, when the cap assembly 34 is removed from casing 31, the sides of casing 31 having flexible arms 42 are pressed inwardly to disengage locking members 43 from slot 35 allowing the cap 34 to be separated from the casing 31. Batteries can be inserted or removed in this manner. When the cap assembly 34 and the casing 31 have been reassembled as illustrated in FIG. 3B, the flexible arms 38 extending upwardly from cap 34 can be pressed inwardly to insert the battery assembly 20 in the housing 14 of the tool 10 where the locking members 22 engage slot 21 or the battery assembly 20 may be inserted in the battery charger 102 illustrated in FIG. 9 and FIG. 10 where the locking members 22 engage slots 108. In either case, the battery assembly 20 is held securely either in the housing 14 of the tool 10 or in the chamber 106 of the battery charger 102.

Figure 4A:
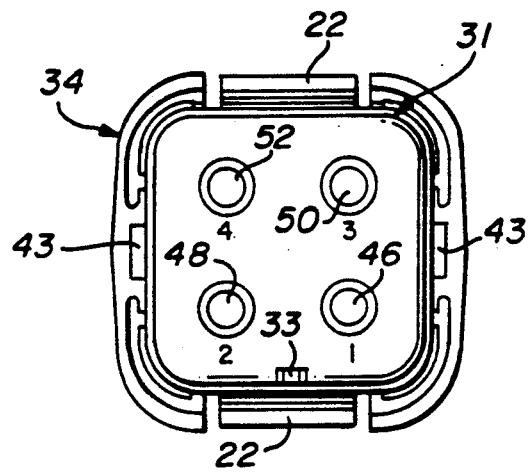
FIG. 4A is a top view of the battery assembly.
Figure 4B:
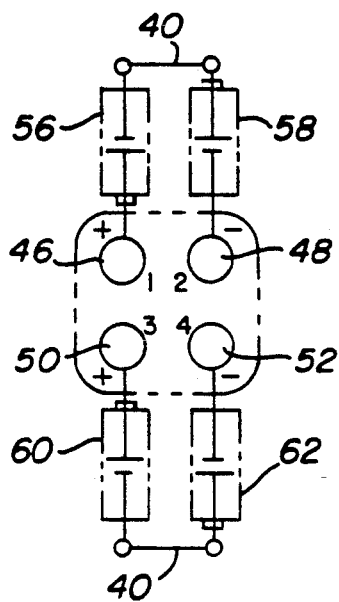
FIG. 4B is a circuit diagram of the internal connection of the battery cells of the battery assembly.

FIG. 4A illustrates a top view of the battery assembly 20. Battery housing 31 has a plurality of contacts exposed on the top thereof. Specifically, orifices 46, 48, 50 and 52 expose corresponding battery terminals 1, 2, 3 and 4, respectively.

Referring now to FIG. 4B, the operability of battery assembly 20 can be more readily understood by reference to the circuit diagram. Battery cell 56 has its positive pole electrically exposed at orifice 46 of battery casing 31. The negative pole of battery cell 56 is correspondingly electrically connected to the positive pole of a battery 58 through one of the springs 40 shown in FIG. 3B. The negative pole of battery 58 is exposed in orifice 48 of battery casing 31. Orifice 50 of casing 31 electrically exposes the positive pole of a battery cell 60. The negative pole of battery cell 60 is correspondingly electrically connected to the positive pole of a battery cell 62 through the other one of springs 40 shown in FIG. 3. Finally, the negative pole of battery cell 62 is electrically exposed at orifice 52 of battery casing 31. In its operation, orifices 46 and 48 electrically expose one battery set since the battery cells 56 and 58 are in series. Correspondingly, orifices 50 and 52 electrically expose a second set of batteries which operate independent of the other contacts since battery cells 60 and 62 are in series.

Figure 4C:
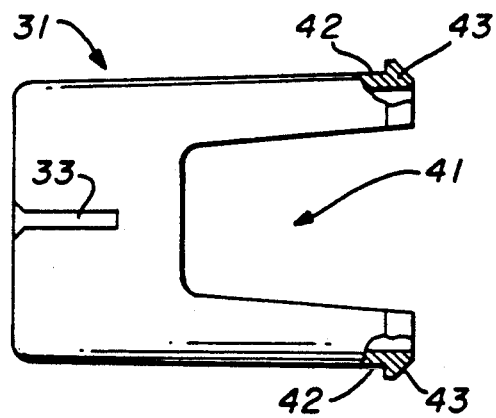
FIG. 4C is a side view of the casing portion of the battery assembly illustrating the resilient locking members in partial cross section.
Figure 4D:
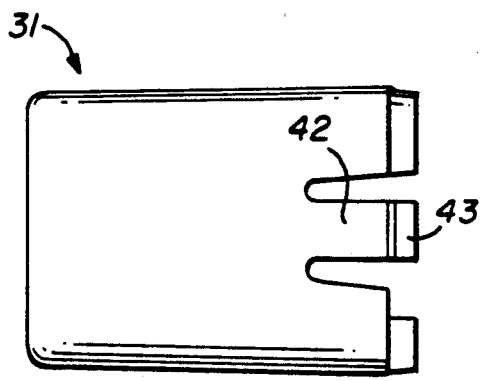
FIG. 4D is a side view of the casing portion of the battery section taken at 90° with respect to the view shown in FIG. 4C.
Figure 4E:
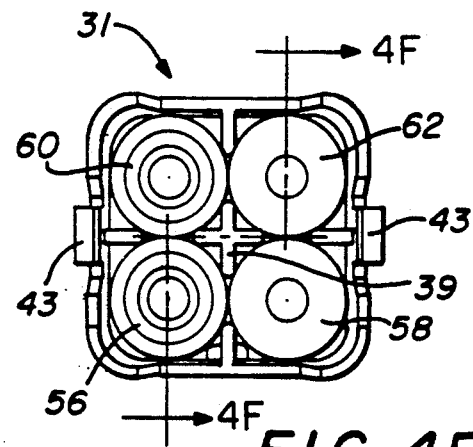
FIG. 4E is a bottom view of the casing portion of the battery assembly illustrating the batteries placed therein.
Figure 4F:
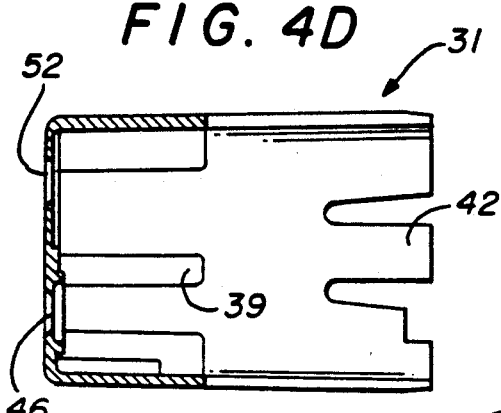
FIG. 4F is a partial cross-sectional view of the casing of the battery assembly taken along the lines of 4F—4F of FIG. 4E.

FIGS. 4C, D, E and F disclose further details of the battery casing 31. A side view of battery casing 31 shown in FIG. 4C illustrates the flexible arms 42 and the locking members 43 on the end thereof for engaging the notches 35 in the cap 34 to hold the two securely together. A notch 33 is formed in one side of the battery casing 31 so that it can be inserted in the tool housing 14 or the battery charger 102 in only one direction, thereby preventing improper insertion thereof. FIG. 4D is a side view of the battery casing 31 taken 90° away from the view illustrated in FIG. 4C. In that view, the flexible arms 42 and the locking mechanisms or members 43 are clearly shown. In FIG. 4E, a bottom view of the battery casing 31 is shown with four batteries 56, 58, 60 and 62 inserted therein. Again, the locking members 43 on the ends of flexible arms 42 can be seen. A centered divider member 39 is integrally formed with the casing 31 and enables the batteries to maintain their respective positions in the casing 31. FIG. 4F is a partial cross-sectional view of battery casing 31, illustrating the orifices 46 and 52 through which the positive and negative terminals of the batteries are accessible by the contact arms 28 of switch element 26.

Figure 5A:
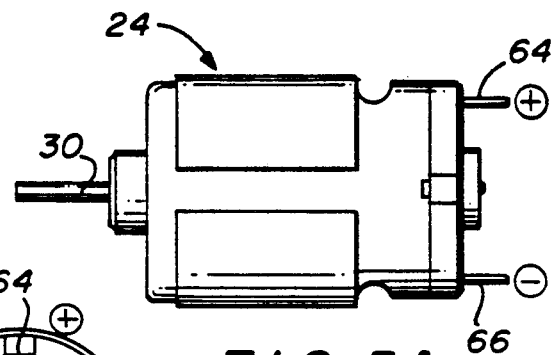
FIG. 5A is a bottom view of the motor.

In FIG. 5A, the details of motor 24 can be further understood. Motor 24 has a shaft 30 extending therefrom for rotating a bit when engaged thereto. The other end of motor 24 has a terminal 64 and terminal 66 extending therefrom. Terminals 64 and 66 correspond to the positive and negative terminals, respectively, of motor 24.

Figure 5B:
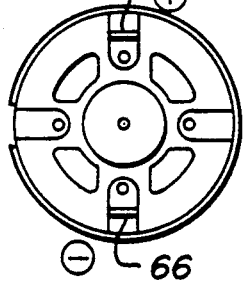
FIG. 5B is a back view of the motor.

FIG. 5B is a back view of motor 24. As can be seen, terminals 64 and 66 are aligned along the axes for electrical engagement when inserted into actuator 26 which will be more readily understood with respect to the FIGS. 6A-6C.

Figure 6A:
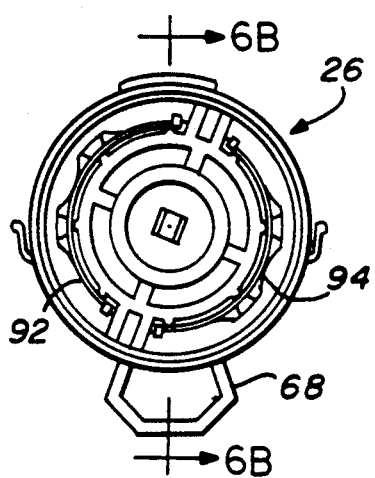
FIG. 6A is a front view of the actuator.

In FIG. 6A, a front view of the actuator can be seen. Actuator 26 has a switch arm 68 extending therefrom for rotating contacts 28 in electrical engagement with the battery terminals exposed in orifices 46, 48, 50 and 52 of battery assembly 20 shown in FIG. 4A. Terminals 64 and 66 of motor 24 are continuously electrically connected respectively to an arcuate conductor 94 or 92.

Figure 6B:
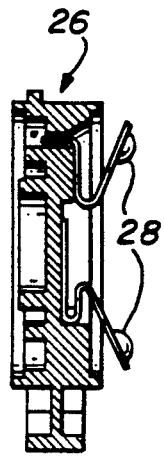
FIG. 6B is a cross-sectional view as shown along lines 6B—6B of FIG. 6A of the actuator.
Figure 6C:
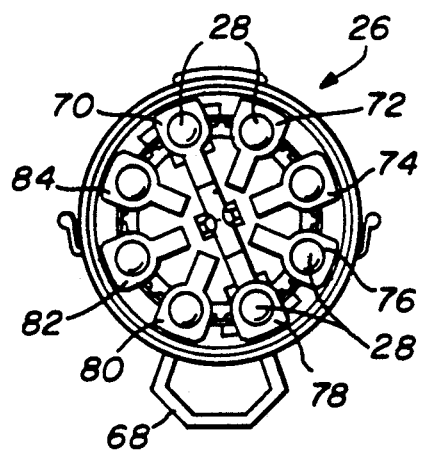
FIG. 6C is a back view of the actuator as seen from the battery assembly.

FIG. 6B is a cross-sectional view of actuator 26 as seen along lines 6B—6B in FIG. 6A. As can be seen, actuator 26 has a plurality of contact arms 28 extending therefrom for rotatable engagement with the terminals of battery assembly 20. In particular, with reference to FIG. 6B, the contact arms 28 can be more easily seen. Referring in particular to FIG. 6C, arms 70, 72, 74, 76, 78, 80, 82 and 84 can be seen to be equidistantly aligned along a common circumference. Arms 70 and 78 are electrically interconnected. Arms 72, 74 and 76 are electrically interconnected by arcuate conductor 92 while arms 80, 82 and 84 are electrically interconnected by arcuate conductor 94 as shown in FIGS. 6A and 7.

Engagement of the battery assembly 20 with motor 24 can be more easily understood with reference to FIGS. 4A and 6C in conjunction. Specifically, the actuator comprises two sets of three arms and one set of two arms that are arranged to preset a low and high speed condition. Specifically, terminal arms 72, 74 and 76 are interconnected electrically by arcuate conductor 92 and represent a first set, arms 80, 82 and 84 are interconnected electrically by arcuate conductor 94 and represent a second set and arms 70 and 78 are interconnected electrically and represent a third set. The first contact is aligned by rotating switch 68 to the first position to cause certain ones of arms 72, 74 and 76 to contact the battery terminal 4 in orifice 52 alone or by rotating switch 68 to the second position to contact the battery terminals 2 and 4 in orifices 48 and 52 in parallel through arcuate conductor 92. Correspondingly, the second set of arms are simultaneously aligned by rotating switch 68 to the first position to cause certain ones of arms 80, 82 and 84 to contact the battery terminal 1 in orifice 46 alone or by rotating switch 68 to the second position to contact the battery terminals 1 and 3 in orifices 46 and 50 in parallel through arcuate conductor 94. The third set of arms either interconnect battery terminals 2 and 3 in orifices 48 and 50, respectively, or connect to no battery terminals. These connections allow low speed and high speed operation as can be more readily understood with reference to the operation of the motor 24 hereafter discussed.

Figure 7:
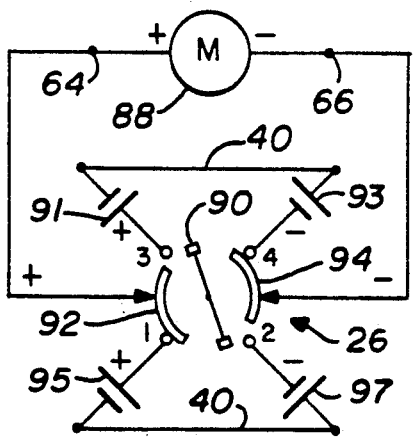
FIG. 7 is a circuit diagram of the present invention illustrating the actuator in its off position.

The operation of the present invention can be more readily understood when referring to FIG. 7 which is a circuit diagram 86 of the present invention. FIG. 7 generally comprises a motor 88 having its negative terminal in continuous electrical connection with the first set of terminal arms 72, 74 and 76 as represented by arcuate switch contact 92. Further, the positive terminal 64 of motor 88 is in continuous electrical connection to the second set of terminal arms 80, 82 and 84 as represented by arcuate contact 94. In addition, switch 90 represents the third set of contact arms 70 and 78. In the position shown in FIG. 7, the motor is in the off position. As can be appreciated, when simultaneously rotating the contacts 90, 92 and 94, the battery terminals 1, 2, 3 and 4 are engaged and disengaged in various configurations. In the position shown, the motor 88 is in the off position because terminals 1, 2, 3 and 4 are disconnected.

Figure 8A:
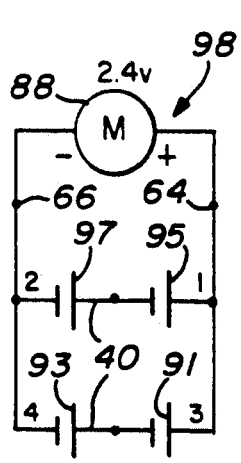
FIG. 8A is a circuit diagram of the present invention illustrating the battery connections at low speed.
Figure 8B:
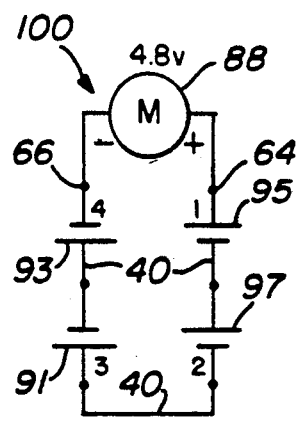
FIG. 8B is a circuit diagram of the present invention illustrating the battery connections at high speed.

When the switch 26 is rotated to the low speed, or clockwise in FIG. 7, arcuate contact 94 engages both battery terminals 1 and 3 in parallel with positive terminal 64. Contact 90 engages no battery terminals and contact 92 engages battery terminals 2 and 4 and negative terminal 66 of motor 88. This creates a circuit wherein batteries 91 and 93 are in series and batteries 95 and 97 are in series but both sets are in parallel as shown in FIG. 8A and motor 88 receives a voltage of 2.4 volts, for example. In contrast, when switch 26 is rotated counterclockwise, arcuate contact 94 couples the positive terminal 64 of motor 88 only to battery terminal 1, contact 90 electrically couples battery contacts 2 and 3 and contact 92 couples only the negative terminal 66 of motor 88 to battery terminal 4. Current then flows from positive terminal 64 through battery terminal 1, series coupled batteries 95 and 97 and battery terminal 2, contact 90 and battery terminal 3, series coupled batteries 91 and 93 to battery terminal 4 and to negative terminal 66 of motor 88. Thus, all batteries are coupled in series as illustrated in FIG. 8B. The motor is therefore switched to a high speed condition because the battery cells are aligned in series and the voltage applied to motor 88 is approximately 4.8 volts, for example.

Figure 9:
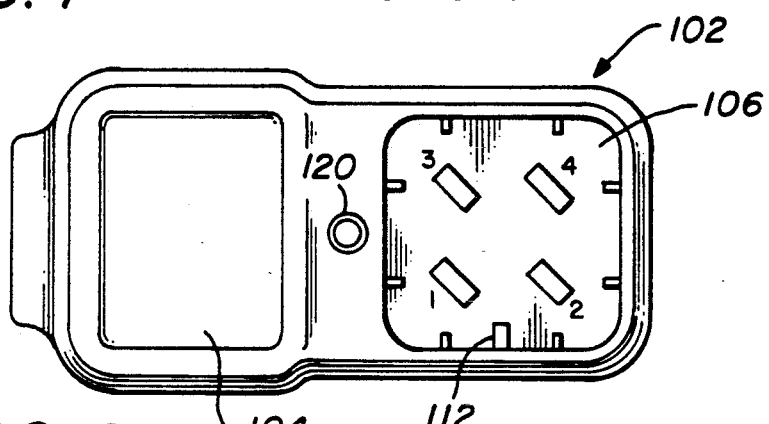
FIG. 9 is a top view of the battery charger which can be used to charge the battery assembly of the present invention.
Figure 10:
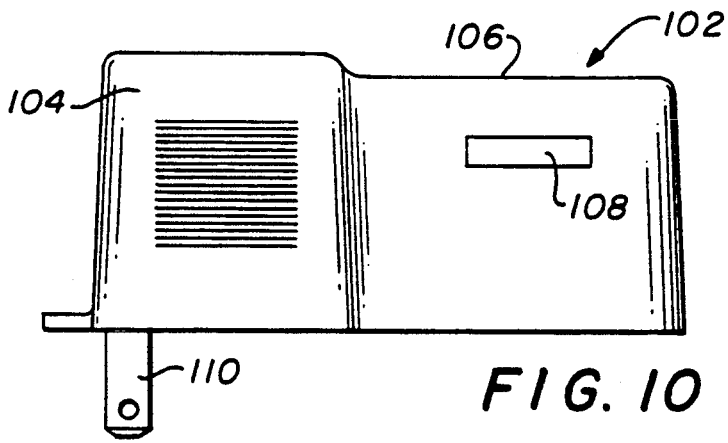
FIG. 10 is a side view of the battery charger illustrated in FIG. 9.

FIG. 9 is a top view of the battery charger 102 that can be utilized to charge the batteries in battery assembly 20. The battery assembly 20 is removed from the power tool 10 by pressing flexible arms 38 to release locking members 22 from slot 21. It is then inserted in the battery charger such that slot 33, as shown in FIG. 4C, engages projection 112 of the battery charger 102. Thus, the battery assembly 20 can be inserted in recessed compartment 106 in only one direction so that contacts of the batteries accessible through orifices 46, 48, 50 and 52 may contact switch elements 1, 2, 3 and 4 in the proper order. A light-emitting diode 120 is formed as a part of the battery charger 102 to illustrate when the unit is functioning. FIG. 10 is a side view of the charger 102, illustrating the portion 104 for containing the circuitry and the recessed portion 106 for receiving the charger. A slot 108 is formed in the side of the recessed area 106 to receive the locking members 22 of arms 38 to lock the battery assembly 20 in the charging unit 102. Typical electrical plugs or terminals 110 are formed as part of the charger 102 so that the unit 102 can be plugged into a conventional 110-volt socket.

Figure 11:
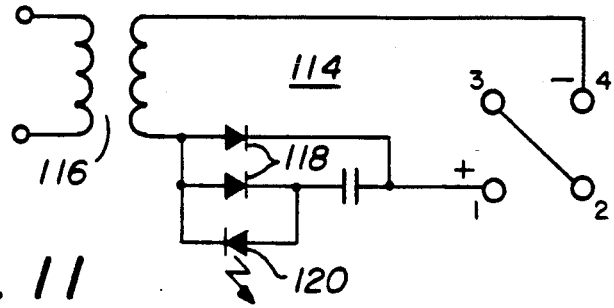
FIG. 11 is a circuit diagram of the battery charger shown in FIG. 9 and FIG. 10.

FIG. 11 is a circuit diagram of the charging circuit 114 which includes a transformer 116 for receiving the input AC-voltage from terminals 110. Diodes 118 rectify the incoming AC-voltage in a halfway rectification and present the rectified voltage to terminals 1 and 4 of the charger where the battery terminals meet. Light-emitting diode 12 is coupled in parallel with rectifiers 118 to emit a light when the device is functioning properly.

The battery assembly 20 can be made take apart for use with individual battery cells or nontake apart for use with rechargeable cell pairs. Notch 33 is shortened in the take-apart unit to prevent full insertion of the battery assembly 20 into the recessed portion 106 of the charger, and thus prevent non-rechargeable type battery cells from making electrical contact with charger 102. Springs 40 are replaced by welded straps in the nontake-apart unit in order to reduce electrical losses. In addition, the flexible arms 42 of the battery casing 31 are shortened in the nontake-apart battery assembly 20 to prevent disassembly of the battery casing 31 from the battery cap 34.

In summary, an advantageous battery-powered hand-held tool has been disclosed that features the use of a battery assembly which is easily coupled to a housing for engagement and disengagement. The switch actuator of the motor is easily rotated to a low and high speed condition without physical removal of any of the battery cells and allows for reduction of wiring within the housing of the tool.

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

I claim:

1. A battery power tool comprising:
   a motor having a positive terminal and a negative terminal rigidly extending from one end and a rotatable shaft at the other end;
   a first battery set having first and second terminals;
   a second battery set having first and second terminals;
   said first and second battery terminals being substantially axially aligned with said rigid motor electrical terminals; and
   an actuator switch abutting the motor and having arcuate connectors on one side continuously rotatably connected to said rigid motor electrical terminals, said arcuate connectors having a plurality of actuator contacts extending from the other side for selectively contacting said battery terminals to cause said motor to rotate at variable speeds.

2. The apparatus as in claim 1 wherein said actuator contacts comprise eight resilient arms extending from the actuator switch and spaced equidistantly about the circumference of said actuator.

3. The apparatus as recited in claim 2 wherein said actuator contacts comprise first and second electrically interconnected sets of three arms and a third electrically interconnected set of two arms positioned to couple all of the batteries in series in a first position of the actuator switch to actuate said motor at high speed.

4. The apparatus as recited in claim 3 wherein said actuator contacts couple the batteries in a parallel arrangement in a second position of the actuator switch to actuate said motor at low speed.

5. The apparatus as recited in claim 4 wherein said battery assembly comprises two sets of two series coupled battery cells for providing power to said motor.

6. The apparatus as recited in claim 5 wherein said battery assembly comprises four battery contacts corresponding to the positive and negative terminals of each of said two battery sets.

7. The apparatus as recited in claim 6 wherein said four battery contacts are selectively positioned to engage said first, second and third sets of actuator arms in said first position of the actuator switch to couple the two battery sets in series and operate said motor at high speed.

8. The apparatus as recited in claim 6 wherein said four battery contacts are selectively positioned to engage said first, second and third sets of actuator arms in said second position of the actuator switch to couple the two battery sets in parallel and operate said motor at low speed.

9. The apparatus as recited in claim 1 further comprising a battery charger for selectively receiving said battery assembly after said battery assembly is removed from said tool, said battery charger being electrically connectible with an AC outlet to permit recharging of said battery cells on engagement.

10. An electrical system for a battery-powered, hand-held motor tool, which comprises:
    a motor having first and second rigid electrical terminals projecting from said motor;
    a first battery set having first and second terminals;
    a second battery set having first and second terminals;
    said first and second battery terminals being substantially axially aligned with said rigid motor electrical terminals; and
    an actuator rotatably mounted between said motor and said axially aligned first and second battery sets, said actuator having arcuate contacts for continuous electrical connection with said rigid motor terminal projections, said actuator having arms for selective connection with the terminals of said first and second battery sets for operating said motor at variable speeds.

11. The apparatus as recited in claim 10 wherein said first battery set and said second battery set are selectively coupled to said motor by rotating said actuator to a first position to cause said first battery set and said second battery set to be electrically connected in series to drive said motor at high speed.

12. The apparatus as recited in claim 10 wherein said first battery set and said second battery set are selectively coupled to said motor by rotating said actuator to a second position to cause said first battery set and said second battery set to be electrically connected in parallel to drive said motor at low speed.

13. A hand-held motor tool for rotating a bit, which comprises:
    a substantially cylindrical-shaped housing;
    a direct-current motor mounted in said housing, said motor having a shaft at one end, said motor having first and second electrical terminals at the other end;
    a substantially cylindrical-shaped collet connected to said shaft, said collet being selectively engageable with the bit;
    a battery assembly detachably and slidably engageable in said housing, said battery assembly having four battery contacts at its first end; and
    a substantially disc-shaped actuator switch rotatably held in said housing abutting said motor and coaxially aligned with and between said motor and said first end of said battery assembly, said actuator having a pair of motor contact arms continuously electrically coupled to said motor electrical terminals and having a plurality of battery contact arms, said battery contact arms being selectively connected with said battery contacts to operate the motor at high speed when said actuator switch is rotated to a first position, and being selectively connected with said battery contacts so as to operate said motor at low speed when said actuator switch is rotated to a second position.

14. The tool as recited in claim 13, wherein said battery assembly comprises:

a casing;

four battery cells slidably held in said casing; and a cap slidably engageable with said casing, said casing having a first resilient locking member for engaging said cap to hold said battery cells in said casing, said cap having a second resilient locking member to engage said housing and hold said battery assembly and casing in said tool.

15. The tool as recited in claim 14, further comprising a battery charger having an AC wall plug integrally connected thereto, said charger having an opening for receiving said battery to recharge said battery cells.

* * * * *

UNITED STATES PATENT AND TRADEMARK OFFICE
CERTIFICATE OF CORRECTION

PATENT NO. : 5,298,821
DATED : March 29, 1994
INVENTOR(S) : Timothy P. Michel

It is certified that error appears in the above-indentified patent and that said Letters Patent is hereby corrected as shown below:

Column 6, line 60, change "12" to --120--.

Column 7, line 35, change "electrical" to --battery--.

Signed and Sealed this

Thirty-first Day of January, 1995

Attest:

BRUCE LEHMAN

Attesting Officer    Commissioner of Patents and Trademarks